United States Patent
Wang et al.

(10) Patent No.: US 9,300,524 B2
(45) Date of Patent: Mar. 29, 2016

(54) MESSAGE FORWARDING BETWEEN GEOGRAPHICALLY DISPERSED NETWORK SITES

(71) Applicant: Hangzhou H3C Technologies Co., Ltd., Hangzhou, Zhejiang (CN)

(72) Inventors: Yi Wang, Beijing (CN); Wei Wang, Beijing (CN); Zhen Ma, Beijing (CN)

(73) Assignee: HANGZHOU H3C TECHNOLOGIES CO., LTD., Zhejiang (CN)

( * ) Notice: Subject to any disclaimer, the term of this patent is extended or adjusted under 35 U.S.C. 154(b) by 0 days.

(21) Appl. No.: 14/394,149

(22) PCT Filed: Aug. 15, 2013

(86) PCT No.: PCT/CN2013/081522
§ 371 (c)(1),
(2) Date: Oct. 13, 2014

(87) PCT Pub. No.: WO2014/067316
PCT Pub. Date: May 8, 2014

(65) Prior Publication Data
US 2015/0081869 A1    Mar. 19, 2015

(30) Foreign Application Priority Data

Oct. 30, 2012  (CN) .......................... 2012 1 0422550

(51) Int. Cl.
*G06F 15/173*     (2006.01)
*H04L 12/24*      (2006.01)
(Continued)

(52) U.S. Cl.
CPC .......... *H04L 41/046* (2013.01); *H04L 12/4633* (2013.01); *H04L 12/4641* (2013.01); *H04L 61/2038* (2013.01); *H04L 61/6022* (2013.01); *Y02B 60/44* (2013.01)

(58) Field of Classification Search
CPC .............. H04L 41/046; H04L 61/2038; H04L 61/6022; H04L 61/103; H04L 12/38; H04L 12/4633; H04L 45/72

USPC ................... 709/203, 223, 249; 370/255, 392
See application file for complete search history.

(56) References Cited

U.S. PATENT DOCUMENTS 7,046,666 B1 *  5/2006  Bollay .............. H04L 29/12009
                                                370/392
7,444,405 B2 * 10/2008  Gangadharan .... H04L 29/12839
                                                370/391

(Continued)

FOREIGN PATENT DOCUMENTS

| CN | 101035050 | 9/2007 |
| CN | 101102264 | 1/2008 |

(Continued)

OTHER PUBLICATIONS

"Virtual Private LAN Service Architectures and Operation", Cisco Systems, Inc. 2008.

(Continued)

*Primary Examiner* — Frantz Jean
(74) *Attorney, Agent, or Firm* — Mannava & Kang, P.C.

(57) ABSTRACT

A first aggregation layer device at a first site learns Media Access Control (MAC) address information received from a second aggregation layer device at a second site. The MAC address information includes: a VLAN identifier (ID), an aggregated MAC address, and an aggregated MAC address mask configured at the second site. When receiving a message addressed to the VLAN ID and a destination MAC address, the first aggregation layer device searches for the MAC address information based on the VLAN ID and destination MAC address and forwards the message to the second aggregation layer device according to the MAC address information. The destination MAC address belongs to the same MAC address segment as the aggregated MAC address and searching for the MAC address information includes mask matching based on the aggregated MAC address mask.

15 Claims, 4 Drawing Sheets

(51) Int. Cl.
  *H04L 29/12* (2006.01)
  *H04L 12/46* (2006.01)

(56) References Cited

U.S. PATENT DOCUMENTS

| | | | |
|---|---|---|---|
| 7,593,400 B2 | 9/2009 | Zelig et al. | |
| 7,792,058 B1 * | 9/2010 | Yip | H04L 12/4641 370/255 |
| 8,014,410 B2 | 9/2011 | Sergeev et al. | |
| 8,175,107 B1 | 5/2012 | Yalagandula et al. | |
| 8,971,323 B2 * | 3/2015 | Mithyantha | H04L 45/586 370/217 |
| 2008/0247406 A1 | 10/2008 | Figueira et al. | |
| 2010/0189117 A1 * | 7/2010 | Gowda | H04L 12/66 370/401 |
| 2012/0063451 A1 | 3/2012 | Keesara et al. | |
| 2012/0327944 A1 | 12/2012 | Zhang | |
| 2013/0336166 A1 * | 12/2013 | Swain | H04L 61/2038 370/255 |

FOREIGN PATENT DOCUMENTS

| | | |
|---|---|---|
| CN | 101127696 | 2/2008 |
| CN | 102143067 | 8/2011 |
| CN | 102594711 | 7/2012 |

OTHER PUBLICATIONS

International Search Report and Written Opinion dated Nov. 28, 2013 issued on PCT Patent Application No. PCT/CN2013/081522 dated Aug. 15, 2013, The State Intellectual Property Office of Republic of China.

* cited by examiner

MESSAGE FORWARDING BETWEEN GEOGRAPHICALLY DISPERSED NETWORK SITES

CROSS-REFERENCE TO RELATED APPLICATION

The present application is a 371 application of International Application No. PCT/CN2013/081522 filed on Aug. 15, 2013 and entitled "Message forwarding between geographically dispersed network sites," which claims benefit of Chinese Patent App. No. CN 201210422550.3 filed on Oct. 30, 2012.

BACKGROUND

In order to improve reliability and provide redundancy, enterprise networks and data centres span across a number of geographically dispersed network sites. Similar services are deployed at the sites connected via layer 2 connectivity. To facilitate dynamic resource allocation and management, virtual machines are allowed to migrate among data centers. The process of virtual machine migration may be transparent to users and in which case their IP addresses remain unchanged.

BRIEF DESCRIPTION OF DRAWINGS

By way of non-limiting examples, the present disclosure will be described with reference to the following drawings, in which.

DETAILED DESCRIPTION

In a network where Virtual Local Area Networks (VLANs) are deployed over geographically dispersed network sites, edge devices (also referred to as "aggregation layer device") exchange MAC address information of host devices so that they are able to forward traffic within that VLAN. Each host device generally connects to an edge device via an access layer device, which may be a server etc. Each edge device stores a MAC address table with a destination host device's MAC address at a local or remote site. To forward a message to the host device, the edge device performs a MAC address table lookup to search for the host device's MAC address (i.e. destination MAC address) in the message.

The present disclosure describes message forwarding in a network where Virtual Local Area Networks (VLANs) are deployed over geographically dispersed sites in a network that comprises a first aggregation layer device at a first site and second first aggregation layer device at a second site. Referring first to an example 100 in FIG. 1:

At 110, the first aggregation layer device learns Media Access Control (MAC) address information received from the second aggregation layer device. The MAC address information includes: a VLAN identifier (ID), an aggregated MAC address and an aggregated MAC address mask configured at the second site.

At 120, when receiving a message addressed to the VLAN ID and a destination MAC address, the first aggregation layer device searches for the MAC address information based on the VLAN ID and destination MAC address and forwards the message to the second aggregation layer device according to the MAC address information. The destination MAC address belongs to the same MAC address segment as the aggregated MAC address and searching for the MAC address information comprises mask matching based on the aggregated MAC address mask.

Figure 1:
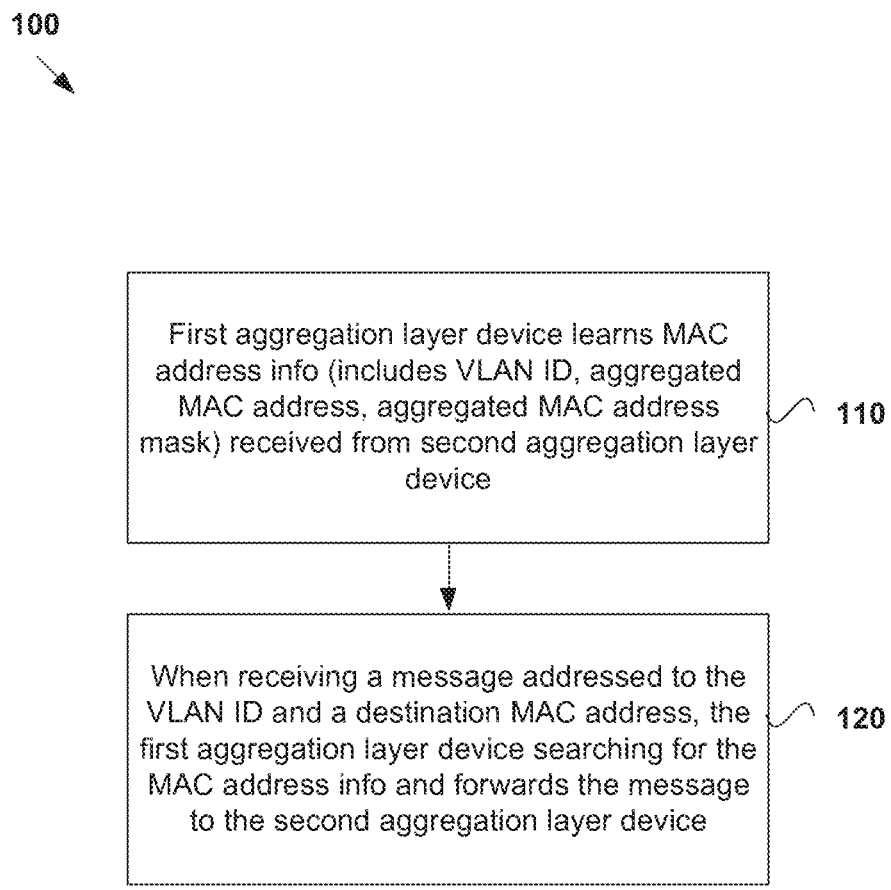
FIG. 1 is a flowchart of an example process for message forwarding between geographically dispersed network sites.

According to the example 100 in FIG. 1, MAC address aggregation is used to reduce the size of MAC address information learned and maintained by the first aggregation layer device. Instead of learning the individual MAC addresses of different host devices, the first aggregation layer device learns an aggregated MAC address that aggregates multiple MAC addresses of different host devices. In practice, since there are many host devices and access layer devices connected to an aggregation layer device, the size of the MAC address information may be significantly reduced by way of MAC address aggregation and mask matching during message forwarding.

For example, an aggregation layer device may be connected to over 500 servers (access layer devices). Each server may configure multiple MAC addresses, in which case the number of MAC addresses can easily reach if not exceed an upper storage limit of an aggregation layer device. The use of aggregated MAC addresses alleviates the need to store a large number of MAC addresses, thereby supporting deployment of large-scale data center network. Further, traffic relating to MAC address information advertisement is also reduced, alleviating the processing burden at the edge devices and within the network.

Throughout the present disclosure, the term "aggregation layer device" refers generally to a network device (e.g. switch etc.) deployed on an aggregation layer of the network 200, and will be used interchangeably with "edge device" throughout the present disclosure. The aggregation layer (also known as convergence layer) facilitates message forwarding among access layer devices within a local site (e.g. Site A), or from a local site to a remote site (e.g. from Site A to Site B). The term "access layer device" refers generally to a network device (e.g. switch, server etc.) that is deployed on an access layer of the network to connect host devices to the aggregation layer device. Further, the term "MAC address information" refers generally to information relating to MAC address, and may include an entry a local MAC address table learned via software and/or hardware.

Examples will be described with reference to accompanying drawings.

Figure 2:
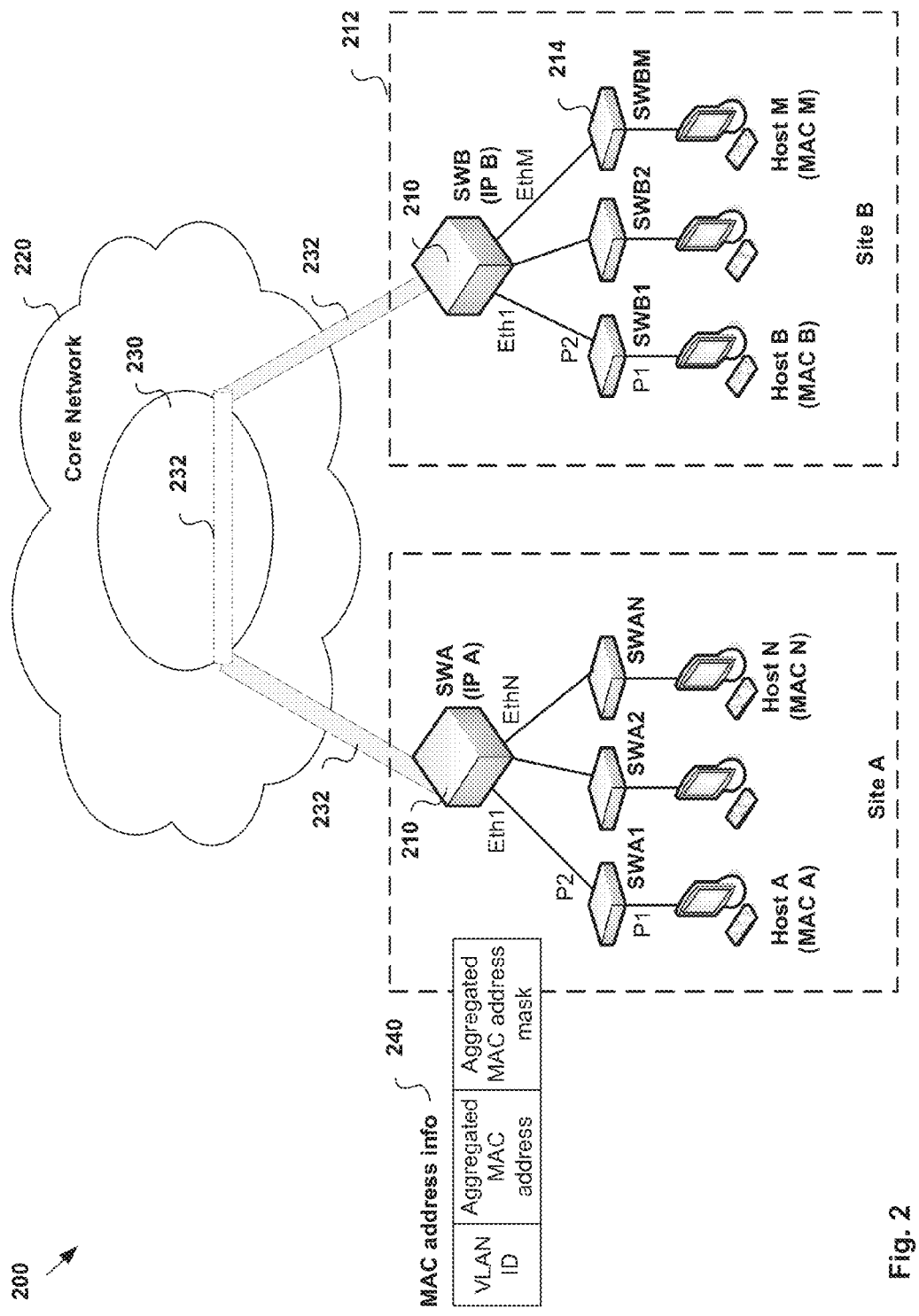
FIG. 2 is a schematic diagram of an example network for message forwarding between geographically dispersed network sites.

FIG. 2 is a schematic diagram of an example network 200 in which multiple edge devices 210 (e.g. SWA and SWB) at geographically dispersed network sites 212 (e.g. sites A and B) are connected via a core network 220. The example network 200 may employ suitable technology, such as Ethernet Virtual Interconnect (EVI) and Overlay Transport Virtualization (OTV) etc.

EVI is an advanced MAC in Internet Protocol (IP) technology for implementing the layer 2 virtual private network (L2VPN) technology in an IP-based core network 220. EVI is used to maintain routing and forwarding information at edge devices 210 of a site, without having to change routing and forwarding information of the core network 220 and within the site 212. A VPN instance may be established among different edge devices 210.

The example network 200 in FIG. 2 includes the following:

The site network 212 represents a layer 2 network which operates independently and is connected to the core network 220 via at least one edge device 210. The site network 212 also generally includes a host device (e.g. Host B in Site B) that is connected to the edge device 210 (e.g. SWB) via an access layer device 214 (e.g. SWB1). In FIG. 2, the edge devices 210 (e.g. SWA and SWB) assume the role of aggregation layer devices while access layer devices (e.g. SWA1-N and SWB1-M) connect host devices (e.g. Hosts A-N at Site A and Hosts B-M at Site B) to the respective aggregation layer devices.

The core network 220 represents a network that includes IP routing devices for providing interconnection between the geographically dispersed sites 212.

An overlay network 230 (e.g. EVI network) represents a virtual network established between edge devices 210 at geographically dispersed sites 212 and provides layer 2 interconnection between the sites to form a larger layer 2 forwarding domain. The network 230 (e.g. EVI network) includes virtual links 232 (e.g. EVI links) and virtual link interfaces (e.g. EVI-link interfaces) to carry layer 2 traffic of an extended VLAN between sites 212.

The virtual links 232 connecting the edge devices 210 of different sites 212 may be any suitable communication channels over a Layer 3 core network 220. In one example, a physical communication medium may be virtualized to include multiple communication channels such that traffic of one communication channel is separated from that of a different communication channel (e.g. using a suitable identifier etc.). The virtual link may be a Layer 2 virtual link (e.g. virtual Ethernet link) tunneled through the Layer 3 network using any suitable protocol (e.g. Generic Routing Encapsulation (GRE) etc.). Layer 2 traffic between sites is encapsulated with an IP header to reach its destination via the core network 120.

To facilitate message forwarding between the geographically dispersed sites, neighbour discovery and MAC address learning are generally performed to form neighbouring relationship and exchange MAC address information.

Neighbour discovery is performed by edge devices 210 to discover each other and form a neighbouring relationship prior to advertising their MAC address information. Any suitable protocol may be used for automatic neighbour discovery, such as EVI neighbour discovery protocol (ENDP) in an EVI network etc. There are two entities in the discovery process: EVI Neighbour Discovery Server (ENDS) and EVI Neighbour Discovery Client (ENDC). After learning information (e.g. IP address) of each ENDC in an EVI network instance via an EVI registration request, the ENDS distributes all received information to the ENDC via a registration reply message.

Upon receiving the reply message, the ENDC establishes an EVI link 232 with other ENDC. Edge devices 210 of all member sites 212 in an EVI network instance may carry out the same registration process, at the end of which each member automatically discovers all information of other members. An authentication function may also be configured to prevent malicious nodes from registering to the EVI network 230. In order to guarantee the high reliability of the EVI network registration process, multiple ENDS may be configured to provide backup for each other. A virtual link 232 is established after the neighbour discovery process.

After the neighbour discovery process, the edge devices 210 notify each other of MAC address information of hosts and devices connected to the edge devices 210. The MAC address information provides information relating unicast MAC address reachability and may be exchanged using any suitable protocol such as Intermediate System-to-Intermediate System (IS-IS) routing protocol etc. This routing protocol is independent from, and does not affect, routing protocols of the layer 3 network in the core network or within a site. Generally, configuring a tunnel interface on the edge device 210 will automatically initiate the IS-IS routing protocol without additional configuration, although parameters of the routing protocol may be adjusted.

When EVI is used for example, running the IS-IS routing protocol includes EVI IS-IS neighbour negotiation, link state protocol (LSP) updates and so on, and the messages involved are transmitted via the virtual links established by the neighbour discovery protocol. The IS-IS routing protocol runs on a point-to-point virtual connection between two edge devices. Each edge device 210 performs a unicast IP address encapsulation of the messages (e.g. Hello and LSP messages), copies and sends them to every remote edge device.

Traffic may then be forwarded between sites once neighbouring relationship is established between edge devices and MAC address information exchanged.

For intra-site message forwarding (e.g. host A to host N within Site A), a local physical interface is used as an outgoing interface (e.g. EthN) to forward a message to a local destination MAC address.

For inter-site message forwarding (e.g. host A at Site A to host B at Site B), the outgoing interface is not a local physical interface, but a tunnel interface (e.g. EVI tunnel interface). The edge device (e.g. SWA) encapsulates the original Ethernet frame (e.g. GRE encapsulation by adding an outer layer IP header, a link layer header and a check sum). For example, the source IP address in the outer layer IP header is the IP address of a carrier interface of a tunnel interface, and the destination IP address is the IP address of the remote edge device (e.g. SWB) obtained by MAC address table lookup.

According to the present disclosure, MAC address aggregation may be used to reduce the size of MAC address information maintained and exchanged by aggregation layer devices 210. In particular, to facilitate message forwarding between geographically dispersed sites (e.g. Site A and Site B), a first aggregation layer device (e.g. SWA) learns MAC address information received from a second aggregation layer device (e.g. SWB) that includes a VLAN ID, aggregated MAC address and aggregated MAC address mask; see 240 in FIG. 2.

When receiving a message addressed to the VLAN ID and a destination MAC address (e.g. MAC address of Host B), the first aggregation layer device (e.g. SWA) searches for the MAC address information and forwards the message to the second aggregation layer device (e.g. SWB) according to the MAC address information. MAC address aggregation reduces the size of MAC address information stored and processed by the aggregation layer devices.

An example will now be explained with reference to the diagram 300 in FIG. 3 in which aggregation layer devices SWA and SWB exchange MAC address information to facilitate message forwarding. Blocks 360 and 370, which are applicable to the first aggregation layer device (e.g. SWA), are related to blocks 110 and 120 in FIG. 1.

Figure 3:
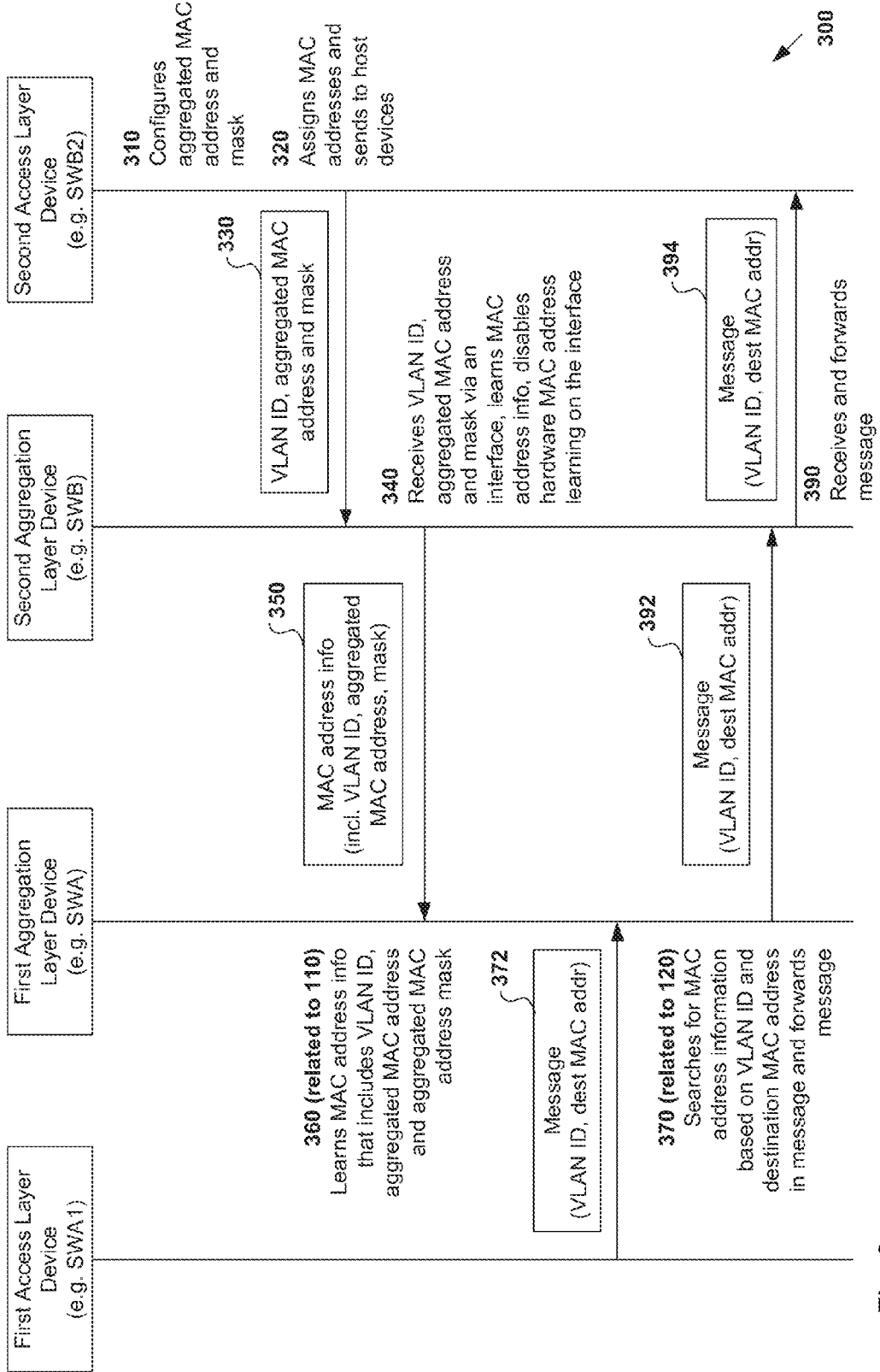
FIG. 3 is a schematic diagram of an example message forwarding process applicable to aggregated layer devices and access layer devices in the network in FIG. 2.

It will be appreciated that the terms "first" and "second" in FIG. 3 are merely used to indicate a "first aggregation layer device" (e.g. SWA) is forwarding a message to a "second aggregation layer device" (e.g. SWB). The terms "first" and "second" do not indicate any specific sequence or order and the roles may be reversed when SWB sends a message to SWA. An aggregation layer device may be capable of acting as both the first aggregation device (message sender) and second aggregation layer device (message recipient). Further, when SWA is forwarding a message to SWB, the former may also be referred to as the local device and the latter as the remote device from the perspective of SWA.

Configuration of Aggregated MAC Address and Mask

At 310 in FIG. 3, each access layer device in a site network (e.g. SWB1 at Site B) is configured with an aggregated MAC address and aggregated MAC mask. The aggregated MAC addresses configured on different access layer devices may be different from each other. Once configured, the MAC addresses of host devices (e.g. Host B to Host M at Site B) coupled to the access layer device (e.g. SWB1) appear transparent to the aggregation layer device.

In one example, aggregated MAC address 0001-0001-0000 and aggregated MAC mask FFFF-FFFF-0000 are configured on access layer device SWA1 at site A. Similarly, aggregated MAC address 0002-0002-0000 and aggregated MAC mask FFFF-FFFF-0000 may be configured on SWB1 at site B.

MAC Address Assignment

At 320 in FIG. 2, the access layer device (e.g. SWB1 at Site B) assigns MAC addresses to its connected host devices based on the configured aggregated MAC address (e.g. 0002-0002-0000). In particular, the assigned MAC addresses belong to the same MAC address segment as the aggregated MAC address.

In one example, the access layer device (e.g. SWB1) calculates MAC addresses that are within the MAC address segment of the aggregated MAC address before assigning the MAC addresses to the host devices in turn. Upon receiving the assigned MAC address, each host device update its MAC address to the assigned MAC address.

Any suitable protocol may be used to send the MAC addresses to the host devices (e.g. host B), such as Data Center Bridging Exchange (DCBX) by adding a Type-Length-Value (TLV) field in a DCBX protocol message as shown in Table 1.

TABLE 1

New TLV field in a modified DCBX message

| Name of TLV | Description | Type | Length | Value |
| --- | --- | --- | --- | --- |
| MAC | Distribution of MAC address | 100 | 6 bytes | MAC address |

In the example in FIG. 2, based on aggregated MAC address 0001-0001-0000 and aggregated MAC mask FFFF-FFFF-0000, SWA1 calculates a list a of MAC addresses that may be assigned to its connected host devices, e.g. host device A. Each host device corresponds to an interface of the access layer device. For example, SWA1 assigns MAC address 0001-0001-0001 to host device A, which is connected to SWA1 via interface P1 of SWA1. SWA1 stores the corresponding relationship between the interface and MAC address, i.e. P1→0001-0001-0001.

Similarly, based on aggregated MAC address 0002-0002-0000 and aggregated MAC mask FFFF-FFFF-0000, SWB1 assigns MAC address 0002-0002-0002 to host device B. Since SWB1 is connected to host device B via interface P1, SWB1 also stores the relationship between P1→0002-0002-0002. When a message addressed to MAC address 0002-0002-0002 is received, the outgoing interface for the message is port P1 of SWB1.

The host devices A and B are notified by SWA1 and SWB1 of their assigned MAC address (e.g. via a DCBX protocol message) and update their MAC address accordingly. The MAC address of host device A is updated to 0002-0002-0002, while host device B's MAC address is 0001-0001-0001.

Advertisement of MAC Address Information

At 330 in FIG. 3, an access layer device (e.g. SWB1) notifies its aggregation layer device (e.g. SWB) of a VLAN ID, and the aggregated MAC address and aggregated MAC address mask configured at 310. The VLAN ID identifies a VLAN whose traffic is permitted to pass through an interface of the access layer device.

Any suitable protocol, such as Link Layer Discovery Protocol (LLDP) etc., may be used. After establishing a LLDP neighbouring relationship with the aggregation layer device, the access layer device may send the VLAN ID, aggregated MAC address and aggregated mask to the aggregation layer device via an LLDP message with the following TLV fields.

TABLE 2

New TLV fields in a modified LLDP message

| Name of TLV | Description | Type | Length | Value |
| --- | --- | --- | --- | --- |
| Port permit VLAN ID | VLAN ID that is permitted to pass through a port | 200 | 512 bytes | Bitmap format is used, 1 indicating a VLAN ID is permitted to pass, 0 indicating otherwise |
| Aggregated MAC address | Aggregated MAC address | 201 | 6 bytes | Aggregated MAC address of access layer device |
| Aggregated MAC mask | Aggregated MAC mask | 202 | 6 bytes | Aggregated MAC mask used for determining whether a MAC address belongs to the same MAC address segment as the aggregated MAC address |

In the example in FIG. 2, SWA1 is connected to SWA via port P2 of SWA1, which belongs to VLAN100 and VLAN200. SWA1 modifies the LLDP protocol message with added TLV fields identifying VLAN100 and VLAN200, aggregated MAC address 0001-0001-0000 and aggregated MAC mask FFFF-FFFF-0000. The LLDP protocol message is then sent to SWA via port P2.

Similarly, SWB1 is connected to SWB via port P2 of SWB1, which belongs to VLAN100 and VLAN200. SWB1 modifies the LLDP protocol message with added TLV fields identifying VLAN100 and VLAN200, aggregated MAC address 0002-0002-0000 and aggregated MAC mask FFFF-FFFF-0000, and sends the LLDP protocol message to SWB via port P2.

Local MAC Address Information Learning

At 340 in FIG. 3, an aggregation layer device (e.g. SWB) learns the MAC address information that includes the VLAN ID, aggregated MAC address and aggregated MAC mask. The MAC address information is received from an access layer device (e.g. SWB1) via one of the interfaces of the aggregation layer device (e.g. Eth1 of SWB).

In one example, learning the MAC address information may include first learning the MAC address information by software by adding a MAC address entry in a local software MAC address table. Each entry, which corresponds to a different VLAN ID, may include the VLAN ID, aggregated MAC address, aggregated MAC mask and outgoing interface information. The MAC address entry is then distributed to a hardware MAC address table for hardware matching of MAC address during message forwarding.

The aggregation layer device (e.g. SWB) may also prohibit hardware learning of MAC address information on the interface (e.g. Eth1 of SWB). Since an aggregated MAC address is used, it is not necessary for the interface to learn the individual MAC addresses of host devices at the site.

In the example in FIG. 2, SWB receives an LLDP protocol message from SWB1 via interface Eth1 and parses the information. SWB disables the hardware MAC address learning function on interface Eth1 and stores the following MAC address information.

TABLE 3

Local MAC address information at SWB

| VLAN | MAC | MAC Mask | IF |
| --- | --- | --- | --- |
| 100 | 0002-0002-0000 | FFFF-FFFF-0000 | Eth1 |
| 200 | 0002-0002-0000 | FFFF-FFFF-0000 | Eth1 |

Similarly, SWA receives an LLDP protocol message from SWA1 via interface Eth1 and parses the information. SWA disables the hardware MAC address learning function on interface Eth1 and stores the following MAC address information.

TABLE 4

Local MAC address information at SWA

| VLAN | MAC | MAC Mask | IF |
| --- | --- | --- | --- |
| 100 | 0001-0001-0000 | FFFF-FFFF-0000 | Eth1 |
| 200 | 0001-0001-0000 | FFFF-FFFF-0000 | Eth1 |

During message forwarding, the aggregation layer device finds an outgoing interface for a received message based on the aggregated MAC mask and a destination MAC address that is within the same MAC address segment of the aggregated MAC address. Mask matching is used instead of direct matching of the MAC address. For a destination MAC address that do not belong to the same MAC address segment, hardware learning and advertisement of the MAC address may be performed as usual.

Remote MAC Address Information Learning

At 360 in FIG. 3, the local MAC address information of one aggregation layer device (e.g. SWB) is received by another aggregation layer device (e.g. SWA) via a virtual link (e.g. EVI tunnel). The MAC address information may be sent way of any suitable protocol, such as IS-IS etc.

In the example in FIG. 2, SWA and SWB notify each other of their MAC address information. The following tables show example MAC address information learned by SWA and SWB.

At SWA:

TABLE 5

MAC address information at SWA

| VLAN | MAC | MAC Mask | IF |
| --- | --- | --- | --- |
| 100 | 0001-0001-0000 | FFFF-FFFF-0000 | Eth1 |
| 200 | 0001-0001-0000 | FFFF-FFFF-0000 | Eth1 |
| 100 | 0002-0002-0000 | FFFF-FFFF-0000 | IP B |
| 200 | 0002-0002-0000 | FFFF-FFFF-0000 | IP B |

At SWB:

TABLE 6

MAC address information at SWB

| VLAN | MAC | MAC Mask | IF |
| --- | --- | --- | --- |
| 100 | 0002-0002-0000 | FFFF-FFFF-0000 | Eth1 |
| 200 | 0002-0002-0000 | FFFF-FFFF-0000 | Eth1 |
| 100 | 0001-0001-0000 | FFFF-FFFF-0000 | IP A |
| 200 | 0001-0001-0000 | FFFF-FFFF-0000 | IP A |

It will be appreciated that the size of the MAC address information in Table 5 and Table 6 is significantly reduced compared to the case where the individual MAC address of each host device is learned. In particular, instead of learning the MAC address of host devices A-N at site A and B-M at site B, an aggregated MAC address and aggregated MAC mask are learned for each VLAN ID.

Message Forwarding Based on Aggregated MAC Address

At 370 in FIG. 3, when receiving a message 372 addressed to a VLAN ID and a destination MAC address, an aggregation layer device (e.g. SWA) searches for the MAC address information learned at 360 in FIG. 3.

Upon receiving the message 372 via an interface, the aggregation layer device (e.g. SWA) may determine whether the hardware MAC address learning function of the interface is disabled. If yes, the aggregation layer device (e.g. SWA) does not learn the message's source MAC address. Based on the message's VLAN ID and destination MAC address, the aggregation layer device (e.g. SWA) looks up a local hardware MAC address table by way of mask matching.

For example, SWA receives an Ethernet message addressed to VLAN 100 and destination MAC address 0002-0002-0002 via interface Eth1. Since hardware MAC address learning is disabled on Eth1, SWA does not learn the source MAC address of the message. Based on the VLAN ID and destination MAC address in the Ethernet frame, SWA searches Table 5 by way of mask matching. The matching entry is as follows:

TABLE 7

Matching MAC address table entry

| VLAN | MAC | MAC Mask | IF |
| --- | --- | --- | --- |
| 100 | 0002-0002-0000 | FFFF-FFFF-0000 | IP B |

At 380 in FIG. 3, the first aggregation layer device (e.g. SWA) forwards the message to the second aggregation layer device (e.g. SWB) according to the MAC address information.

In one example, the first aggregation layer device (e.g. SWA) finds that an outgoing interface in the matching MAC address entry is a tunnel interface (e.g. EVI tunnel interface), and encapsulates the original Ethernet frame (e.g. GRE encapsulation). The source IP address in the outer layer IP header may be the IP address of a carrier interface of a tunnel interface associated with the virtual link between the first and second aggregation layer devices. In this case, the destination IP address of the message is 'IP B' in the matching MAC address entry in Table 7.

At 390 in FIG. 3, the second aggregation layer device (e.g. SWB) receives the message 392 via the virtual link (e.g. via tunnel interface), de-encapsulates the message and looks up a local hardware MAC address table using mask matching according to the VLAN ID, and destination MAC address in the received message. The message is then forwarded via a local interface according to information in the matching hardware MAC address table entry to reach a host device with the destination MAC address.

For example, based on the VLAN ID VLAN 100 and destination MAC address 0002-0002-0002 in the de-encapsulated message, SWB performs mask matching to find the following matching MAC address table entry. The outgoing interface in this case is a local interface, Eth1 at SWB. SWB forwards the Ethernet message via interface Eth1 to reach host device B with MAC address 0002-0002-0002.

TABLE 8

Matching MAC address table entry

| VLAN | MAC | MAC Mask | IF |
|---|---|---|---|
| 100 | 0002-0002-0000 | FFFF-FFFF-0000 | Eth1 |

Example Network Devices 400

Figure 4:
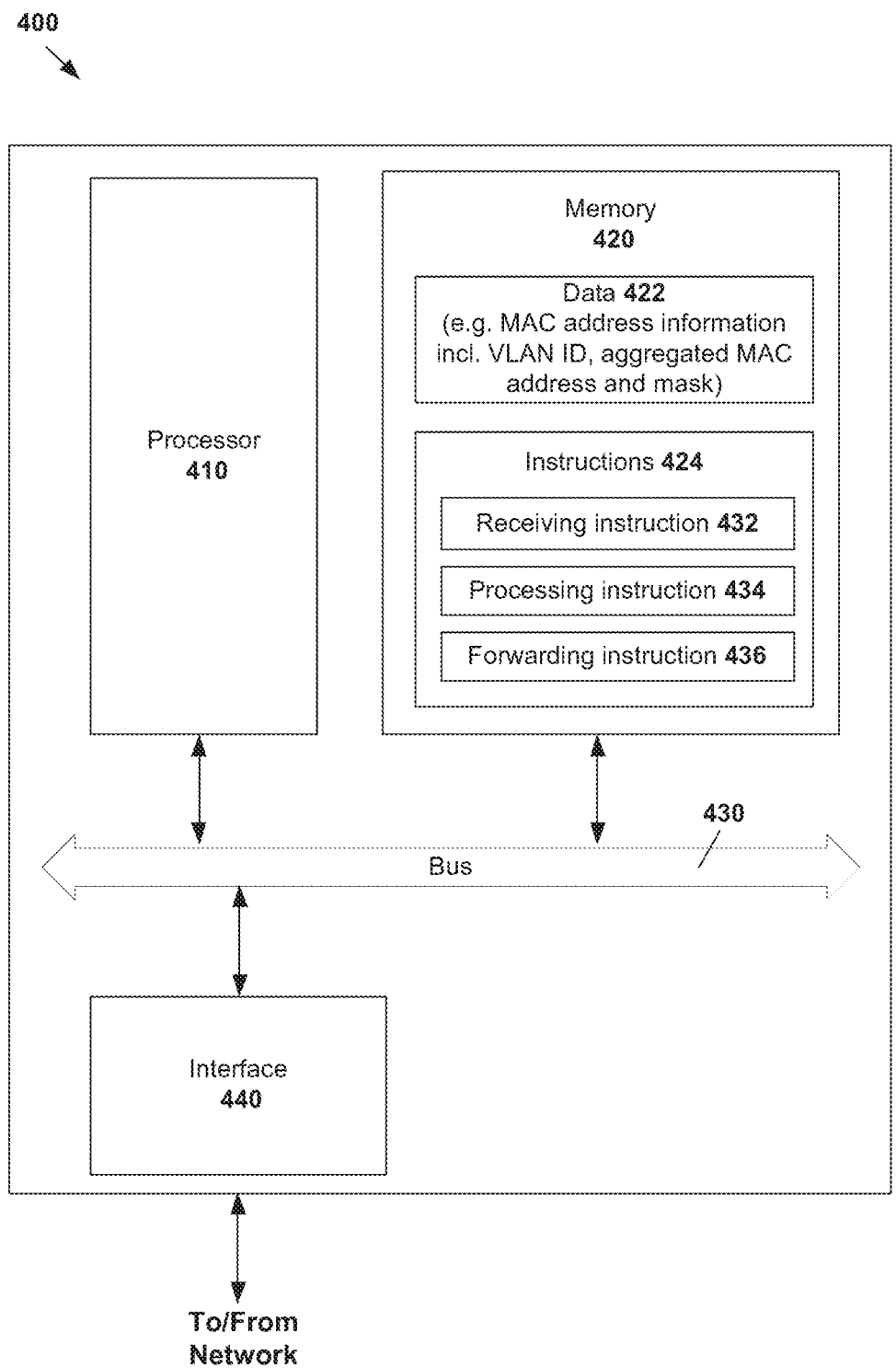
FIG. 4 is a schematic diagram of an example structure of a device capable of acting as an aggregation layer device or access layer device.

The above examples can be implemented by hardware, software or firmware or a combination thereof. Referring to FIG. 4, an example network device 400 that includes a processor 410, a memory 420 and a network interface device 440 that communicate with each other via bus 430. The processor 410 is to perform processes described herein with reference to FIG. 1 to FIG. 3. As will be discussed below, the network device 400 may be capable of acting as an (a) aggregation layer device or (b) access layer device.

(a) Aggregation Layer Device

In one example, the network device 400 is capable of acting as a first aggregation layer device (e.g. SWA) for message forwarding in a network where VLANs are deployed over geographically dispersed sites. The network (e.g. FIG. 2) comprises the first aggregation layer device at a first site and second first aggregation layer device at a second site. In this case, the processor 410 of the network device 400 is to:

Learn MAC address information received from the second aggregation layer device that includes: a VLAN ID an aggregated MAC address and an aggregated MAC address mask configured at the second site. And, Receive a message addressed to the VLAN ID and a destination MAC address, search for the MAC address information based on the VLAN ID and destination MAC address and forward the message to the second aggregation layer device according to the MAC address information.

In this case, the destination MAC address belongs to the same MAC address segment as the aggregated MAC address and searching for the MAC address information comprises mask matching based on the aggregated MAC address mask.

The memory 420 may store any necessary data 422 for facilitating message forwarding between geographically dispersed network sites. For example, the data 422 includes information relating to MAC address information discussed with reference to Tables 1 to 7. The MAC address information includes VLAN ID, aggregated MAC address, and aggregated MAC address mask.

The memory 420 may store machine-readable instructions 424 executable by the processor 410 to cause the processor 410 to perform processes described herein with reference to FIG. 1 to FIG. 3. In the example in FIG. 4, the instructions 424 include receiving instruction 432, processing instruction 434 and forwarding instruction 436.

The receiving instruction 432 is to receive MAC address information received from the second aggregation layer device that includes: a VLAN, an aggregated MAC address and an aggregated MAC address mask configured at the second site. The processing instruction 434 is to learn the MAC address information.

The receiving instruction 432 is to further receive a message addressed to the VLAN ID and a destination MAC address. The processing instruction 434 is further to search for the MAC address information based on the VLAN ID and destination MAC address and the forwarding instruction 436 is to forward the message to the second aggregation layer device according to the MAC address information.

In this case, the destination MAC address belongs to the same MAC address segment as the aggregated MAC address and searching for the MAC address information comprises mask matching based on the aggregated MAC address mask.

In another example (not shown in FIG. 4 for simplicity), the network device 400 is capable of acting as an aggregation layer device in a network deployed with EVI. In this case, the aggregation layer device includes an aggregated MAC entry learning module.

An aggregated MAC entry learning module, for (i) receiving from an interface a VLAN ID that is allowed to pass through a port of an access layer device, and an aggregated MAC address and a mask configured on the access layer device which are reported by the access layer device, (ii) learning MAC entries via software, distributing the entries to a hardware MAC table, and (iii) disabling the interface's function of hardware learning of MAC entries, (iv) sending all MAC entries learned via software to an aggregation layer device at the opposite terminal of an EVI tunnel.

The aggregated MAC entry learning module is further for receiving from a non-local aggregation layer device the MAC entries learned via software, and distributing said MAC entries to a hardware MAC table. The MAC entries include VLAN ID that is allowed to pass through a port of an access layer device under said non-local aggregation layer device, an aggregated MAC address and a mask.

A traffic forwarding module, for receiving an Ethernet message from said interface. If the traffic forwarding module finds that the interface's function of hardware learning of MAC entries is disabled, the traffic forwarding module does not learn the message's source MAC address. Instead, based on the message's VLAN ID and destination MAC address, the traffic forwarding module is to search for a matching MAC entry in the local hardware MAC table by way of mask matching, and forward the message according to the matching MAC entry.

(b) Access Layer Device

In another example, the network device 400 is capable of acting as an access layer device (e.g. SWB1) in a network that includes a first aggregation layer device (e.g. SWA) at a first site, second first aggregation layer device (e.g. SWB) at a second site. The access layer device may be connected to the first aggregation layer device and/or second aggregation layer device and includes a processor to: based on an aggregated MAC address and an aggregated MAC address mask configured at the access layer device, assign a MAC address to a host device connected to the access layer device, wherein the assigned MAC address belongs to the same MAC address segment as the aggregated MAC address.

In this case, assigning the MAC address to the host device may include the access layer device sending the assigned MAC address to the host device via a Data Center Bridge Exchange (BCBX) protocol message with a Type-Length-Value (TLV) field carrying the assigned MAC address.

In this case, the instructions 424 may include appropriate instruction to perform the processes described throughout the present disclosure. The instructions 424 may be combined and divided to perform various processes as appropriate, such as receiving instruction 432, processing instruction 434 and forwarding instruction 436. The processing instruction 434 may be to, based on an aggregated MAC address and an aggregated MAC address mask configured at the access layer device, assign a MAC address to a host device connected to the access layer device, wherein the assigned MAC address belongs to the same MAC address segment as the aggregated MAC address.

In a further example (not shown in FIG. 4 for simplicity), when acting as an access layer device, the network device 400 may include:

An aggregated MAC reporting module, for assigning MAC addresses for hosts coupled to the access layer device according to its configured aggregated MAC address. The hosts' MAC addresses and the aggregated MAC addresses of the access layer device may belong to the same MAC address segment.

The aggregated MAC reporting module is further for reporting to an aggregation layer device the aggregated MAC address and mask and VLAN ID that is allowed to pass through the port of the access layer device.

The methods, processes and units described herein may be implemented by hardware (including hardware logic circuitry), software or firmware or a combination thereof. The term 'processor' is to be interpreted broadly to include a processing unit, ASIC, logic unit, or programmable gate array etc. The processes, methods and functional units may all be performed by the one or more processors 410; reference in this disclosure or the claims to a 'processor' should thus be interpreted to mean 'one or more processors'.

Although one network interface device 440 is shown in FIG. 4, processes performed by the network interface device 440 may be split among multiple network interface devices (not shown for simplicity). As such, reference in this disclosure to a 'network interface device' should be interpreted to mean 'one or more network interface devices".

Further, the processes, methods and functional units described in this disclosure may be implemented in the form of a computer software product. The computer software product is stored in a storage medium and comprises a plurality of instructions for making a processor to implement the methods recited in the examples of the present disclosure.

The figures are only illustrations of an example, wherein the units or procedure shown in the figures are not necessarily essential for implementing the present disclosure. Those skilled in the art will understand that the units in the device in the example can be arranged in the device in the examples as described, or can be alternatively located in one or more devices different from that in the examples. The units in the examples described can be combined into one module or further divided into a plurality of sub-units.

Although the flowcharts described show a specific order of execution, the order of execution may differ from that which is depicted. For example, the order of execution of two or more blocks may be changed relative to the order shown. Also, two or more blocks shown in succession may be executed concurrently or with partial concurrence. All such variations are within the scope of the present disclosure.

Throughout the present disclosure, the word "comprise", or variations such as "comprises" or "comprising", will be understood to imply the inclusion of a stated element, integer or step, or group of elements, integers or steps, but not the exclusion of any other element, integer or step, or group of elements, integers or steps.

It will be appreciated by persons skilled in the art that numerous variations and/or modifications may be made to the above-described embodiments, without departing from the broad general scope of the present disclosure. The present embodiments are, therefore, to be considered in all respects as illustrative and not restrictive.

The invention claimed is:

1. A method for message forwarding in a network where Virtual Local Area Networks (VLANs) are deployed over geographically dispersed sites, wherein the network comprises a first aggregation layer device at a first site and a second first aggregation layer device at a second site, the method comprising the first aggregation layer device:
    learning Media Access Control (MAC) address information received from the second aggregation layer device, wherein the MAC address information includes: a VLAN identifier (ID), an aggregated MAC address and an aggregated MAC address mask configured at the second site; and
    when receiving a message addressed to the VLAN ID and a destination MAC address, searching for the MAC address information based on the VLAN ID and destination MAC address and forwarding the message to the second aggregation layer device according to the MAC address information,
    wherein the destination MAC address belongs to the same MAC address segment as the aggregated MAC address and searching for the MAC address information comprises mask matching based on the aggregated MAC address mask.

2. The method of claim 1, further comprising the first aggregation layer device:
    learning local MAC address information received via an interface of the first aggregation layer device from an access layer device at the first site,
    wherein the local MAC address information includes: a VLAN ID of a VLAN whose message is allowed to pass through a port of the access layer device, and an aggregated MAC address and an aggregated MAC address mask configured on the access layer device;
    disabling a hardware MAC address learning function of the interface of the first aggregation layer device; and
    sending the local MAC address information to the second aggregation layer device.

3. The method of claim 2, further comprising the first aggregation layer device:
    receiving a message addressed to a VLAN ID and a destination MAC address from the second aggregation layer device, wherein the destination MAC address belongs to the same MAC address segment as the aggregated MAC address in the local MAC address information;
    de-encapsulating the received message;
    based on the VLAN ID and destination MAC address, searching for the local MAC address information by way of mask matching using the aggregated MAC address mask in the local MAC information and forwarding the de-encapsulated message to the access layer device at the first site network according to the local MAC address information.

4. The method of claim 2, wherein:
    the local MAC address information is received from the first access layer device via a Link Layer Discovery Protocol (LLDP) protocol message with a Type-Length-Value (TLV) field that includes the VLAN ID, aggregated MAC address and aggregated MAC address mask.

5. The method of claim 1, wherein:
    the VLAN ID in the MAC address information received from the second aggregation layer device is a VLAN ID that is allowed to pass through a port of a second access layer device connected to the second aggregation layer device; and the aggregated MAC address information and aggregated MAC address mask are configured on the second access layer device.

6. The method of claim 1, wherein the first aggregation layer device learning the MAC information further comprises:

learning the MAC address information via software; and distributing the MAC address information to a hardware MAC table at the first aggregation layer device.

7. The method of claim 1, wherein forwarding the message further comprising the first aggregation layer device:

encapsulating the message with a source IP address in an outer layer Internet Protocol (IP) header and a destination IP address and forwarding the encapsulated message, wherein the source IP address is a carrier interface of a tunnel interface, and the destination IP address is an IP address of the second aggregation layer device.

8. A method for message forwarding in a network where Virtual Local Area Networks (VLANs) are deployed over geographically dispersed sites, wherein the network comprises a first aggregation layer device at a first site, a second first aggregation layer device at a second site, and an access layer device is connected to the first aggregation layer device or the second aggregation layer device, the method comprising the access layer device:

based on an aggregated MAC address and an aggregated MAC address mask configured at the access layer device, assigning a MAC address to a host device connected to the access layer device, wherein the assigned MAC address belongs to the same MAC address segment as the aggregated MAC address.

9. The method of claim 8, wherein:

assigning the MAC address to the host device further comprises the access layer device sending the assigned MAC address to the host device via a Data Center Bridge Exchange (BCBX) protocol message with a Type-Length-Value (TLV) field carrying the assigned MAC address.

10. A network device for message forwarding in a network where Virtual Local Area Networks (VLANs) are deployed over geographically dispersed sites, wherein the network comprises a first aggregation layer device at a first site and a second first aggregation layer device at a second site, the network device capable of acting as the first aggregation layer device and comprising a processor to:

learn Media Access Control (MAC) address information received from the second aggregation layer device, wherein the MAC address information includes: a VLAN identifier (ID), an aggregated MAC address and an aggregated MAC address mask configured at the second site; and receive a message addressed to the VLAN ID and a destination MAC address, search for the MAC address information based on the VLAN ID and destination MAC address and forward the message to the second aggregation layer device according to the MAC address information, wherein the destination MAC address belongs to the same MAC address segment as the aggregated MAC address and searching for the MAC address information comprises mask matching based on the aggregated MAC address mask.

11. The network device of claim 10, wherein the processor is further to:

learn local MAC address information received via an interface of the first aggregation layer device from an access layer device at the first site, wherein the local MAC address information includes: a VLAN ID of a VLAN whose traffic is allowed to pass through a port of the access layer device, and an aggregated MAC address and an aggregated MAC address mask configured on the access layer device;

disable a hardware MAC address learning function of the interface of the first aggregation layer device; and send the local MAC address information to the second aggregation layer device.

12. The network device of claim 11, wherein the processor is further to:

receive a message addressed to a VLAN ID and a destination MAC address from the second aggregation layer device, wherein the destination MAC address belongs to the same MAC address segment as the aggregated MAC address in the local MAC address information;

de-encapsulate the received message;

based on the VLAN ID and destination MAC address, search for the local MAC address information by way of mask matching using the aggregated MAC address mask in the local MAC information and forward the de-encapsulated message to the access layer device at the first site network according to the local MAC address information.

13. The network device of claim 11, wherein the processor is to:

receive the local MAC address information from the first access layer device via a Link Layer Discovery Protocol (LLDP) protocol message with a Type-Length-Value (TLV) field that includes the VLAN ID, aggregated MAC address and aggregated MAC address mask.

14. The network device of claim 10, wherein:

the VLAN ID in the MAC address information received from the second aggregation layer device is a VLAN ID that is allowed to pass through a port of a second access layer device connected to the second aggregation layer device; and the aggregated MAC address information and aggregated MAC address mask are configured on the second access layer device.

15. A network device for message forwarding in a network where Virtual Local Area Networks (VLANs) are deployed over geographically dispersed sites, wherein the network comprises a first aggregation layer device at a first site, a second first aggregation layer device at a second site, and an access layer device is connected to the first aggregation layer device or the second aggregation layer device, the network device being capable of acting as the access layer device and comprising a processor to:

based on an aggregated MAC address and an aggregated MAC address mask configured at the access layer device, assign a MAC address to a host device connected to the access layer device, wherein the assigned MAC address belongs to the same MAC address segment as the aggregated MAC address.

* * * * *